United States Patent Office 2,776,926
Patented Jan. 8, 1957

2,776,926

PREPARATION OF ALPHA-KETOGLUTARIC ACID BY SERRATIA MARCESCENS

Eugene S. Sharpe, Eureka, and Julian Corman, Peoria, Ill., assignors to the United States of America as represented by the Secretary of Agriculture No Drawing. Application August 4, 1955, Serial No. 526,576

1 Claim. (Cl. 195—47)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to a method for producing alpha-ketoglutaric acid from *Serratia marcescens* organisms, and it relates more particularly to a novel method employing cultural conditions which afford a high yield of the desired acid.

The biological oxidation of glucose to alpha-ketoglutaric acid is believed to occur step-wise, resulting in the intermediate formation of at least one distinct compound, namely 2-ketogluconic acid. The oxidation is typically enzymic, and is believed to involve a system of a plurality of different enzymes.

Alpha-ketoglutaric acid is an important industrial chemical possessing many uses, one of which is as an intermediate in the synthesis of glutamic acid.

Our invention is based on the discovery that the yield of alpha-ketoglutaric acid from a fermentation utilizing *Serratia marcescens* organisms affords chemically significant yields of this acid if proper cultural conditions are employed. According to our findings, unless these conditions are employed, however, the yields of this acid are so low as to be of academic interest only.

We have found two factors which are mainly responsible for our yields. They are (1) the use of at least 10 percent glucose in the culture medium, based on the weight-volume relationship; and (2) the employment of aeration at an efficiency of at least about 3.0. The aeration efficiency (A. E.) is defined as the millimols of oxygen absorbed per liter of medium per minute.

Our fermentations, according to this invention are carried out, using conventional sources of assimilable nitrogen and conventional nutrient minerals. We may supply the oxygen in the form of oxygen gas or mixtures of gases containing appreciable amounts of oxygen, as for example atmospheric air. The time of the fermentation is of the order of 10 days or more, although this time may be shortened considerably under special circumstances. The course of the fermentation may be followed by reducing power observations of the culture medium. We have found that when this value reaches about 0.5 precent, expressed as glucose, the fermentation is nearly complete. It may be harvested for alpha-ketoglutaric acid at a suitable time thereafter. Alternatively it may be permitted to go as low as 0.3 percent or lower, which often involves fermentation times of 12 days or longer.

The following specific examples illustrate our invention. The amounts given are based on weight-volume relationship and are expressed as percentages in accordance with conventional practice in this art.

EXAMPLE 1

A basal medium was made up according to the following table:

Table I

| Ingredients | Percent |
|---|---|
| Diammonium citrate | 0.33 |
| $Na_2SO_4$ | 0.05 |
| $MgSO_4 \cdot 7H_2O$ | 0.08 |
| $KH_2PO_4$ | 0.5 |
| NaCl | 0.004 |
| $MnSO_4 \cdot 4H_2O$ | 0.004 |
| $Fe^{+++}$ ammonium citrate | 0.005 |

Solutions of glucose were autoclaved separately and then added in sufficient amount to give a concentration of glucose of 4, 8, and 12 percent in separate flasks. In addition calcium carbonate was autoclaved and added to the flasks in the amount of 2, 4 and 6 percent respectively. The fermentations were carried out in 300 ml. of culture media contained in modified Fernbach flasks. These flasks had 16 vertical indentations approximately one and one-half inches high and evenly spaced about the circumference of the base.

Each flask was inoculated with a culture of *Serratia marcescens* organisms, strain 8 UK (NRRL B–1481), and the flasks were placed on a rotary shaker and fermented at 28° C. Agitation was such that the media absorbed approximately 3.0 millimols oxygen per liter media per minute, that is A. E. was 3.0.

At the end of 136 hours, the media of the 3 flasks had the following analysis:

Table II

| Initial glucose, g. per 100 ml. medium | pH | Glucose, percent | α-ketoglutaric acid, g. per 100 g. initial glucose |
|---|---|---|---|
| 4 | 8.50 | 0.08 | 4.5 |
| 8 | 7.95 | 0.21 | 11.1 |
| 12 | 6.60 | 1.66 | 7.2 |

At the end of 210 hours, the culture media in the flasks had the following analysis:

Table III

| Initial glucose, g. per 100 ml. medium | pH | Glucose, percent | α-ketoglutaric acid, g. per 100 g. initial glucose |
|---|---|---|---|
| 4 | 8.60 | 0.05 | 3.7 |
| 8 | 8.05 | 0.12 | 14.8 |
| 12 | 6.75 | 1.78 | 13.4 |

At the end of 306 hours, the media in the flasks had the following analysis:

Table IV

| Initial glucose, g. per 100 ml. medium | pH | Glucose, percent | α-ketoglutaric acid, g. per 100 g. initial glucose |
|---|---|---|---|
| 4 | 0.90 | 0.02 | 0 |
| 8 | 8.10 | 0.12 | 13.0 |
| 12 | 8.00 | 0.34 | 33.3 |

EXAMPLE 2

The procedure of Example 1 was carried out, using the same basal medium except that flask B and flask C were plain Fernbach flasks, and were aerated at A. E. of 0.2 and 0.7 respectively.

In this example, flask A thus is substantially a duplicate of the flask of the preceding experiment which had been provided with 12 percent glucose.

Inasmuch as the purpose of this experiment was served at the end of 162 hours (to demonstrate the effect of decreased A. E.), the fermentations were not carried further. The results are summarized in Table V.

*Table V*

| Culture | pH | Glucose, Percent | α-keto-glutaric, Percent |
|---|---|---|---|
| A | 6.70 | 4.27 | 18.3 |
| B | 8.70 | 0.80 | 0.0 |
| C | 7.90 | 0.68 | 3.0 |

A review of the above table will illustrate the criticality of our A. E. limitation for successful production of high yields of alpha-ketoglutaric acid.

We claim:

A method for the production of alpha-ketoglutaric acid comprising cultivating *Serratia marcescens* in a medium comprising an assimilable nitrogen source, essential nutrient salts, and at least 10 grams of glucose per 100 ml. of medium, introducing oxygen at the aeration efficiency of at least 3.0, permitting the fermentation to continue until the reducing power of the medium has dropped to 0.5 or lower, and recovering alpha-ketoglutaric acid from the medium.

References Cited in the file of this patent

UNITED STATES PATENTS

| | | |
|---|---|---|
| 2,443,919 | Lockwood | June 22, 1948 |
| 2,724,680 | Koepsell | Mar. 11, 1955 |